No. 763,697. PATENTED JUNE 28, 1904.
J. C. SEYL & D. G. BUTTS.
ENVELOP SEALING MACHINE.
APPLICATION FILED NOV. 28, 1902.
NO MODEL. 2 SHEETS—SHEET 1.

Witnesses:
Inventors
J. C. Seyl & D. G. Butts
By Price & Fisher
Attorneys

THE NORRIS PETERS CO., PHOTO-LITHO., WASHINGTON, D. C.

No. 763,697. PATENTED JUNE 28, 1904.
J. C. SEYL & D. G. BUTTS.
ENVELOP SEALING MACHINE.
APPLICATION FILED NOV. 28, 1902.
NO MODEL. 2 SHEETS—SHEET 2.
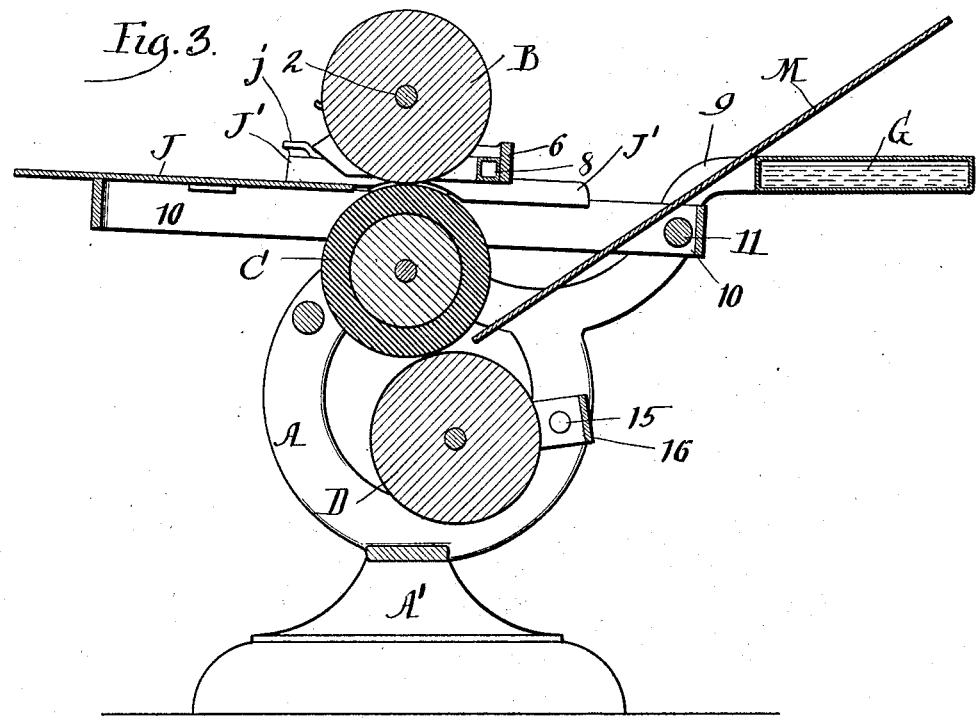
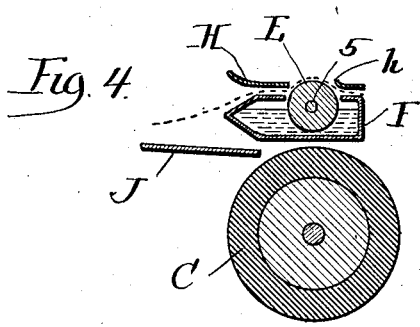
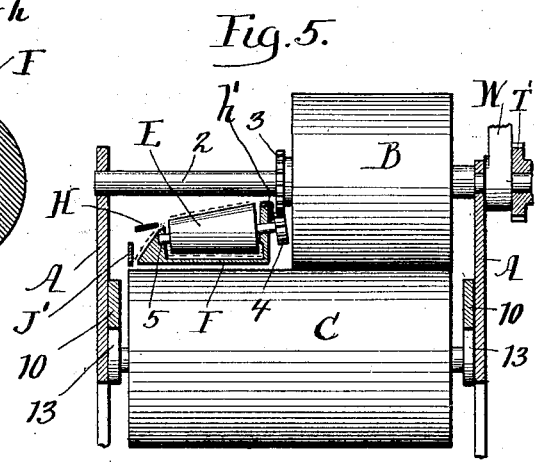
Witnesses:
Fred Gerlach
Lillian Prentice
Inventors
J. C. Seyl & D. G. Butts
By Paris Fisher
Attorneys.

No. 763,697. Patented June 28, 1904.

UNITED STATES PATENT OFFICE.

JOSEPH C. SEYL AND DANIEL GRANT BUTTS, OF CHICAGO, ILLINOIS.

ENVELOP-SEALING MACHINE.

SPECIFICATION forming part of Letters Patent No. 763,697, dated June 28, 1904.

Application filed November 28, 1902. Serial No. 133,029. (No model.)

*To all whom it may concern:*

Be it known that we, JOSEPH C. SEYL and DANIEL GRANT BUTTS, citizens of the United States, and residents of Chicago, Cook county, Illinois, have jointly invented certain new and useful Improvements in Envelop-Sealing Machines, of which the following is a full, clear, and exact description, reference being had to the accompanying drawings, forming a part of this specification.

This invention has for its object to provide a simple, cheap, and effective machine for moistening and sealing envelops; and the invention consists in the features of improvements hereinafter described, illustrated in the accompanying drawings, and particularly pointed out in the claims at the end of this specification.

Figure 1:
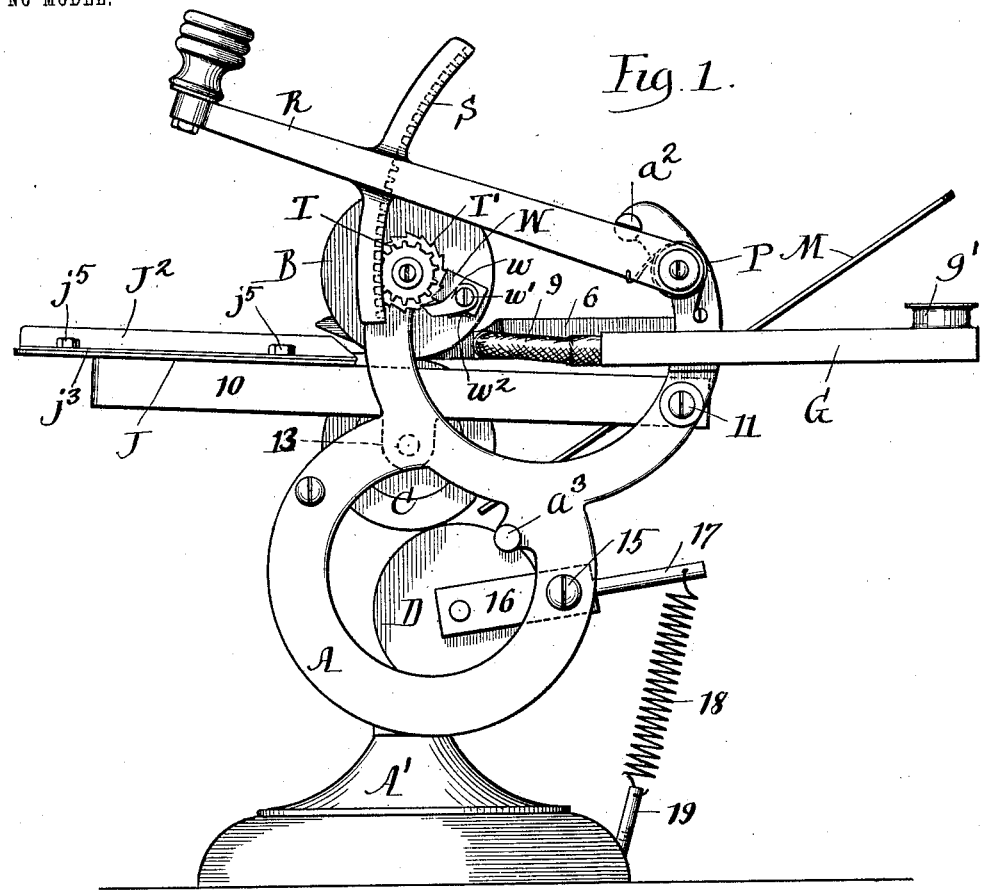
Figure 2:
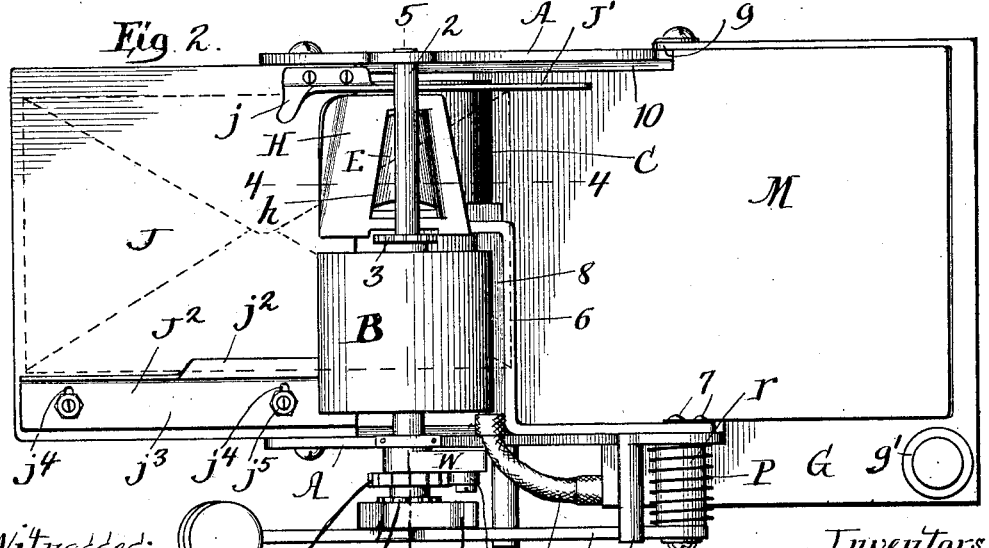

Figure 1 is a view in side elevation of an envelop-sealing machine embodying our invention. Fig. 2 is a plan view. Fig. 3 is a view in central vertical section. Fig. 4 is a detail view, in vertical section, of certain parts of the machine on line 4 4 of Fig. 2. Fig. 5 is a detail view, in cross-section, of certain parts of the machine on line 5 5 of Fig. 2.

Like characters of reference designate corresponding parts in the various views of the drawings.

A designates the side walls of the main frame of the machine that is preferably supported upon a central base or pedestal A'. Between the side walls of the main frame are journaled a series of feed-rollers B, C, and D, that serve to advance the envelops to be sealed. The feed-roller C is covered with rubber or like material adapted to securely grip the surface of the envelops, and, if desired, similar covers may be employed for the rollers B and D, although this is not essential. The roller B is fixed upon the shaft 2, that is journaled at the top of the main frame, and this roller extends but partially across the machine. Upon the shaft 2 and adjacent the inner end of the roller B is fixed a gear-wheel 3, that meshes with a pinion 4 upon the inner end of a shaft 5 of the conical moistening-roll E. This moistening-roll E is preferably made of a porous material—such as carbon, unglazed porcelain, or the like—as we have discovered that a porous roller of carbon, porcelain, or like material serves to take up from the water-tray and apply to the envelop-flap just the proper quantity water to insure the effective sealing of the flap without danger of applying an excess of water. Carbon such as is ordinarily used for the points of the electric-arc lights is found very suitable for the manufacture of the moistening-roll.

The shaft 5 of the moistening-roll E is journaled in the side walls of a water pan or tray F, that is supported by a bracket 6, that is bolted, as at 7, to the side walls of the main frame. The bracket 6 is formed with a tube or channel 8, that leads to the tray F, and to the outer end of the tube or channel 8 is connected a flexible pipe 9, that is attached to a tubular nipple leading from a water pan or reservoir G, that has arms $g$, bolted to the side walls A of the main frame. The water pan or reservoir G extends from side to side of the machine at its rear and is provided with a funnel-shaped filling-orifice $g'$, by which water may be conveniently introduced into the pan. Above the moistening-roll E is mounted a guide-frame H, within the opening $h$ of which the conical roll E revolves. The guide-frame H has a downwardly-bent portion $h'$, that is conveniently fastened to the end wall of the water-tray F. The purpose of the guide-frame H is to insure the bearing of the envelop-flaps against the surface of the conical roll E, as will presently more fully appear.

The water-tray F tapers from its inner toward its outer end, and its front edge is V-shaped, as shown, the purpose of this construction being to lift or open up the flaps of the envelops and cause them to pass over the surface of the roll E and beneath the guide-frame H. In front of the rolls B and C about their point of contact is mounted the delivery-table J, that extends beneath the front edge of the water-tray F, and the edge of the table J adjacent the outer end of the water-tray is formed with a guide-arm J', preferably of the shape shown in the drawings. This guide-arm J', which rises from the surface of the table J, is provided at its front with a horn $j$, that coöperates with the upturned front edge of the guide-frame H in directing the flaps of the envelops as they enter the machine. At the opposite side of the table J is mounted a guide-plate J², preferably formed with an overhanging flange $j^2$, this guide-plate having a base-flange $j^3$, that is preferably slotted, as at $j^4$, for the passage of bolts $j^5$, that enable the guide-plate J² to be adjusted to suit envelops of different widths. The table J is mounted upon the front portion of a rectangular frame 10, that is pivoted, as at 11, to the side walls A of the main frame, and from the sides of the frame 10 depend the arms 13, in which are journaled the ends of the shaft of the feed-roller C.

Between the side walls of the main frame A is also pivoted, as at 15, a yoke-shaped frame 16, between the arms of which are journaled the ends of the shaft that carries the lowermost feed-roll D. From the rear of the yoke-shaped frame 16 projects an arm 17, to which is connected the upper end of a coil-spring 18, the lower end of this spring being preferably attached to an adjusting-bolt 19, that passes through a threaded hole in the base A' of the main frame. By the adjustment of the bolt the tension of the spring can be varied as desired. The spring 18 serves to force the lowermost feed-roll D up against the central feed-roll C and by its bearing against this central feed-roll to lift it bodily and into bearing against the uppermost feed-roll B. Hence it will be seen that by varying the tension of the spring 18 the pressure of the feed-rolls upon each other may be modified as desired. Within the frame A and extending obliquely downward from rear toward the front is a guide-table M, the lower end of which terminates at a point adjacent the point of contact of the feed-rolls C and D. The purpose of this table M is to receive the envelops as they pass rearwardly from between the feed-rolls B and C and direct the envelops downward between the rolls C and D in order that the sealing of the flaps of the envelops may be effected.

Revolution may be imparted to the feed-rolls in any desired manner, and the shaft of either of the feed-rolls may be connected to the source of power. In the accompanying drawings we have shown the shaft 2 of the uppermost feed-roll B as extended beyond the main frame and provided with one-way gear mechanism by which motion may be imparted to the shaft 2 from a vibrating hand-lever R, that is pivoted to an arm $r$, projecting from one of the side walls of the main frame. As shown, the hand-lever R has connected thereto or formed in piece therewith a segmental rack S, the teeth of which mesh with a pinion T, that is loosely mounted upon the end of the shaft 2. With the hub of the pinion T is suitably connected a ratchet-wheel T', with which engages a pawl $w$, that is pivoted, as at $w'$, upon an arm W, that is fastened to the shaft 2. A spring $w^2$, having one end fixed at the base of the arm W, bears at its free end upon the pawl $w$, thereby serving to hold the pawl in engagement with the teeth of the ratchet-wheel T'. The hand-lever R is forced normally upward by a coiled spring P, that encircles the arm $r$, one end of this coil-spring being attached to the hand-lever R, while the opposite end of the spring is fixed to one of the side walls of the main frame. The extent of movement of the hand-lever R is shown as limited in upward direction by a stop-arm $a^2$, projecting from the side arm of the main frame, and is limited in a downward direction by a similarly-projecting stop-arm $a^3$, with which the lower end of the segmental rack S will contact.

From the foregoing description the operation of the machine will be seen to be as follows: When downward movement is imparted to the hand-lever R, the segmental rack S will be caused to move past the pinion T, thereby imparting revolution to its pinion and to the ratchet-wheel T', connected thereto, and inasmuch as the pawl $w$ is in engagement with the ratchet-wheel this pawl $w$ and the arm W will be forced to revolve with the ratchet-wheel T', and revolution will thus be imparted to the shaft 2 and the feed-roll B carried thereby. Inasmuch as the lowermost feed-roll D is forced into bearing with the central feed-roll C and the central roll is in turn forced to bear against the uppermost feed-roll B by the coil-spring 18, as hereinbefore described, it will be seen that when revolution is imparted to the feed-roll B a corresponding revolution in opposite direction will be imparted to the feed-roll C, while revolution in the same direction is imparted to the lowermost feed-roll D. Upon the upstroke of the hand-lever R the pinion T and ratchet-wheel T' will revolve loosely upon the shaft 2 without imparting revolution to the shaft, as the ratchet-wheel at such time will move past the spring-pressed end of the pawl $w$. If now an envelop be placed upon the table J, with its flap slightly raised, and be forced toward the feed-rolls B and C, so that the front edge of the water-tray F is beneath the flap of the envelop, then as rotation is imparted to the feed-rolls in manner above described the envelop will be drawn between the feed-rolls and at the same time its flap will be pressed by the guide-frame H over the periphery of the conical moistening-roll E, which taking water from the tray will deliver it upon the gummed inner surface of the envelop-flap. The envelop thus caught by the feed-rolls B and C will be advanced by them onto the inclined table M, and this table will direct the envelop downward into the bite of the feed-rolls C and D, that will seal the moistened flap of the envelop as it passes between these rolls.

In an envelop-sealing machine, in combination with a revoluble roller and means for supplying liquid thereto, we do not claim any one of the following details—viz., (*a*) a pressure-plate for holding the flap of the envelop in contact with such roller and an opening in such pressure-plate opposite such roller; (*b*) a pressure-plate for bending the flap of the envelop partially around such roller and an opening in such pressure-plate opposite such roller; (*c*) a pressure-arm each side of such roller and arranged to hold the flap of the envelop in contact therewith; (*d*) a pressure-arm each side of such roller and arranged to bend the flap of the envelop partially around such roller. Neither of the four combinations noted forms any part of the present invention.

Having thus described our invention, what we claim as new, and desire to secure by Letters Patent, is—

1. An apparatus of the character described comprising a receptacle for liquid, an uncovered moistening-roll of carbon or equivalent rigid and porous material rotatably mounted within said receptacle and arranged to project above and below the level of the liquid contained therein and above the upper edge of said receptacle.

2. An envelop-sealing machine comprising a vertical train of parallel feed-rolls, a moistening device adjacent the upper feed-rolls and an inclined deflecting-table at the back of the feed-rolls, said deflecting-table being arranged to cause the passage of the envelops between the lowermost rolls of the train.

3. An envelop-sealing machine comprising a vertical train of parallel feed-rolls, a moistening device adjacent the uppermost feed-roll, a table at the front of said parallel feed-rolls provided with means for guiding the envelop to the moistening device and beneath the upper feed-roll and an inclined deflecting-table at the back of the feed-rolls, the lower end of said deflecting-table terminating adjacent the top of the lowermost feed-roll and serving to deliver the envelop to the feed-rolls at such point.

4. An envelop-sealing machine comprising a vertical train of three feed-rolls, a moistening device arranged adjacent the uppermost feed-roll, a deflecting-table at the back of the feed-rolls to direct the envelop, after its flap has been moistened to the top of the lowermost feed-roll, and means for actuating said rolls.

5. An envelop-sealing machine comprising a vertical train of three feed-rolls, a moistening device adjacent one end of the uppermost feed-roll, a deflecting-table at the back of the feed-rolls and serving to guide the envelop, after its flap has been moistened, to the top of the lowermost feed-roll, and a spring-actuated frame for sustaining said lowermost feed-roll and forcing it normally upward.

6. An envelop-sealing machine comprising a vertical train of three feed-rolls, a moistening device adjacent one end of the uppermost feed-roll, a deflecting-table at the back of the feed-rolls and serving to guide the envelop, after its flap has been moistened, to the top of the lowermost feed-roll, a spring-actuated frame for sustaining said lowermost feed-roll and forcing it normally upward, and means whereby the tension of said spring may be varied.

7. An envelop-sealing machine comprising a conical moistening-roll and feed-rolls arranged adjacent said moistening-roll for advancing the envelop against said moistening-roll.

8. An envelop-sealing machine comprising a conical moistening-roll, a water-tray beneath said moistening-roll, feed-rolls adjacent said moistening-roll and means for directing the flap of the envelop against said moistening-roll as the envelop is advanced by the feed-rolls.

9. An envelop-sealing machine comprising a conical moistening-roll, a guide-frame for pressing the envelop-flap against said moistening-roll and feed-rolls for advancing the envelop past said moistening-roll.

10. An envelop-sealing machine comprising a conical moistening-roll, means for directing the flap of an envelop against said moistening-roll, feed-rolls for advancing the envelop past said moistening-roll, means for supplying liquid to said moistening-roll and gearing for driving said moistening-roll in unison with the feed-rolls.

11. An envelop-sealing machine comprising a pair of feed-rolls, means for moistening the envelop-flap located at the end of the contacting surfaces of said feed-rolls, said moistening means comprising a conical moistening-roll, a liquid-receptacle located beneath said conical roll, gearing for driving said conical roll and means for directing the envelop-flap over said conical roll while the body of the envelop is between the feed-rolls.

12. An envelop-sealing machine comprising a pair of feed-rolls, a moistening-roll of smaller diameter adjacent the end of the uppermost feed-roll, a water-tray wherein said moistening-roll revolves, a support for said moistening-roll and a water-tray connected to the inner end thereof and a fixed presser guide-plate arranged to direct the envelop-flap around the free outer ends of said moistening-roll and water-tray over the top thereof.

13. An envelop-sealing machine comprising a pair of feed-rolls, a moistening-roll arranged to present an inclined upper surface and means for directing the envelop-flap around the end and over the top of said moistening-roll.

14. An envelop-sealing machine comprising a pair of feed-rolls, a moistening-roll located at the end of the upper feed-roll and of smaller diameter than said feed-roll, gearing at one end of said moistening-roll for imparting revolution thereto, a liquid-supply tray wherein said moistening-roll sets and guide means for directing the envelop-flap around and over one end of said moistening-roll.

15. An envelop-sealing device comprising a pair of feed-rolls, the upper feed-roll being shorter than the feed-roll beneath it, a moistening-roll arranged above the lower feed-roll and at the end of the upper feed-roll, gearing for driving said moistening-roll connected to its inner end and a presser device for holding the envelop-flap against said moistening-roll as the envelop is advanced by the feed-rolls.

16. An envelop-sealing machine comprising a pair of feed-rolls; one of said feed-rolls being shorter than the other, a moistening-roll located at the end of said shorter feed-roll, a water-tray for supplying liquid to said moistening-roll and wherein said moistening-roll sets, said tray having a reduced front edge to open the envelop-flap and means for guiding the envelop-flap around the free end of and against said moistening-roll and means for driving said feed-rolls and said moistening-roll.

17. An envelop-sealing machine comprising a pair of feed-rolls, a delivery-table at the front of said feed-rolls having side guides, a conical moistening-roll adjacent the inner end of said delivery-table, a water-tray having a reduced front edge for guiding the envelop-flap and means for pressing the envelop-flap against the moistening-roll as the envelop is advanced by the feed-rolls.

18. An envelop-sealing machine comprising feed-rolls, a moistening-roll of small diameter adjacent the end of the uppermost feed-roll, a water-tray wherein said moistening-roll revolves, a presser mechanism for holding the envelop-flap against the moistening-roll, means for guiding the envelop-flap around the water-tray and around the outer end of the moistening-roll, a water-reservoir and a suitable connection between said water-reservoir and said water-tray.

19. An envelop-sealing machine comprising a train of vertically-disposed feed-rolls, the uppermost roll being supported in fixed bearings, a pivoted frame for sustaining the middle roll of the train and a spring-actuated pivoted frame for supporting the lowermost roll of the train and for forcing the rolls toward each other.

20. In an envelop-sealing machine in combination with a folding mechanism arranged to fold the flap of the envelop over upon the body thereof, a conically-formed moistening-roller located above the bed of the machine and arranged to come in contact with the flap of the envelop as it is being folded over upon the body thereof, means for supplying suitable liquid to the roller, and for preventing contact between such roller and the body of the envelop, the small end of such roller pointed toward the fold between the flap and the body of the envelop.

21. In an envelop-sealing machine in combination with a folding mechanism arranged to fold the flap of the envelop over upon the body thereof, a conically-formed moistening-roller located above the bed of the machine, and arranged to come in contact with the flap of the envelop as it is being folded over upon the body thereof, means for supplying suitable liquid to such roller, and for preventing contact between such roller and the body of the envelop, and means for rotating such roller, the small end of such roller pointed toward the fold between the flap and the body of the envelop.

JOSEPH C. SEYL.
D. GRANT BUTTS.

Witnesses:
  Geo. P. Fisher, Jr.,
  Fred Gerlach.